(12) United States Patent
Buck et al.

(10) Patent No.: US 8,375,212 B2
(45) Date of Patent: Feb. 12, 2013

(54) METHOD FOR PERSONALIZING AN AUTHENTICATION TOKEN

(75) Inventors: Peter Buck, London (GB); Peter Newport, London (GB)

(73) Assignee: Prism Technologies LLC, Omaha, NE (US)

( * ) Notice: Subject to any disclaimer, the term of this patent is extended or adjusted under 35 U.S.C. 154(b) by 0 days.

(21) Appl. No.: 12/978,754

(22) Filed: Dec. 27, 2010

(65) Prior Publication Data

US 2011/0093708 A1    Apr. 21, 2011

Related U.S. Application Data

(62) Division of application No. 10/176,974, filed on Jun. 20, 2002, now Pat. No. 7,865,738.

(30) Foreign Application Priority Data

May 10, 2002    (GB) .................................. 0210692.0

(51) Int. Cl.
*H04L 9/32* (2006.01)

(52) U.S. Cl. ........................................ 713/173; 705/66

(58) Field of Classification Search .......... 713/168–173, 713/181–184; 705/65–67; 726/9, 10, 20; 235/380, 382; 340/5.81, 5.85

See application file for complete search history.

(56) References Cited

U.S. PATENT DOCUMENTS

| | | | |
|---|---|---|---|
| 3,764,742 A | 10/1973 | Abbott et al. | |
| 4,605,820 A | 8/1986 | Campbell, Jr. | |
| 4,697,072 A | 9/1987 | Kawana | |
| 4,800,590 A | 1/1989 | Vaughan | |
| 5,060,263 A | 10/1991 | Bosen et al. | |
| 5,200,999 A | 4/1993 | Matyas et al. | |
| 5,317,636 A | 5/1994 | Vizcaino | |
| 5,343,529 A | 8/1994 | Goldfine et al. | |
| 5,577,121 A * | 11/1996 | Davis et al. ..................... | 705/67 |
| 5,586,260 A | 12/1996 | Hu | |
| 5,592,553 A | 1/1997 | Guski et al. | |
| 5,638,444 A | 6/1997 | Chou et al. | |
| 5,657,388 A | 8/1997 | Weiss | |
| 5,699,528 A | 12/1997 | Hogan | |
| 5,737,421 A | 4/1998 | Audebert | |
| 5,745,571 A | 4/1998 | Zuk | |
| 5,802,176 A | 9/1998 | Audebert | |
| 5,887,065 A | 3/1999 | Audebert | |
| 5,903,721 A | 5/1999 | Sixtus | |
| 5,913,203 A | 6/1999 | Wong et al. | |

(Continued)

FOREIGN PATENT DOCUMENTS

| | | |
|---|---|---|
| EP | 0 174 016 | 3/1986 |
| EP | 1 028 401 | 8/2000 |

(Continued)

OTHER PUBLICATIONS

"The SecurID Mechanism," Nystrom at al., Jan. 1999.

*Primary Examiner* — Nirav B Patel
(74) *Attorney, Agent, or Firm* — Martin & Ferraro, LLP (57) ABSTRACT

An authentication token using a smart card that an organization would issue to its customer, the smart card having a processor for executing a software application that is responsive to a user input to generate a one-time password as an output. The smart card co-operates with an interface device for inputting the user input and displaying the one-time password. The authentication token may be used in combination with a remote authentication server for validation of the password and hence authentication of the user.

4 Claims, 3 Drawing Sheets

U.S. PATENT DOCUMENTS

| | | | |
|---|---|---|---|
| 5,937,068 A | 8/1999 | Audebert | |
| 5,937,394 A | 8/1999 | Wong et al. | |
| 5,956,699 A | 9/1999 | Wong et al. | |
| 5,963,915 A | 10/1999 | Kirsch | |
| 5,987,232 A | 11/1999 | Tabuki | |
| 6,000,832 A | 12/1999 | Franklin et al. | |
| 6,067,621 A | 5/2000 | Yu et al. | |
| 6,088,450 A * | 7/2000 | Davis et al. | 713/182 |
| 6,148,404 A | 11/2000 | Yatsukawa | |
| 6,163,771 A | 12/2000 | Walker et al. | |
| 6,168,077 B1 | 1/2001 | Gray et al. | |
| 6,194,991 B1 | 2/2001 | Barrs et al. | |
| 6,230,267 B1 * | 5/2001 | Richards et al. | 713/172 |
| 6,377,994 B1 | 4/2002 | Ault et al. | |
| 6,385,723 B1 * | 5/2002 | Richards | 713/160 |
| 6,434,561 B1 | 8/2002 | Durst et al. | |
| 6,442,690 B1 | 8/2002 | Howard et al. | |
| 6,751,733 B1 | 6/2004 | Nakamura et al. | |
| 6,757,825 B1 * | 6/2004 | MacKenzie et al. | 713/169 |
| 6,785,661 B1 | 8/2004 | Mandler et al. | |
| 6,904,526 B1 * | 6/2005 | Hongwei | 713/182 |
| 6,904,626 B1 | 6/2005 | Hongwei | |
| 6,910,131 B1 * | 6/2005 | Yamada et al. | 713/186 |
| 6,940,980 B2 * | 9/2005 | Sandhu et al. | 380/282 |
| 7,007,050 B2 | 2/2006 | Saarinen | |
| 7,080,078 B1 | 7/2006 | Slaughter et al. | |
| 7,281,128 B2 * | 10/2007 | Mikel et al. | 713/155 |
| 7,386,878 B2 * | 6/2008 | Fernando et al. | 726/3 |
| 7,430,668 B1 * | 9/2008 | Chen et al. | 713/187 |
| 7,865,738 B2 | 1/2011 | Buck et al. | |
| 2001/0047335 A1 | 11/2001 | Arndt et al. | |
| 2001/0054148 A1 | 12/2001 | Hoornaert et al. | |
| 2002/0002678 A1 | 1/2002 | Chow et al. | |
| 2002/0010863 A1 | 1/2002 | Mankefors | |
| 2002/0046169 A1 | 4/2002 | Keresman, III et al. | |
| 2003/0112972 A1 | 6/2003 | Hattick et al. | |
| 2004/0059952 A1 | 3/2004 | Newport et al. | |

FOREIGN PATENT DOCUMENTS

| | | |
|---|---|---|
| GB | 2 317 983 | 4/1998 |
| GB | 2 361 790 | 10/2001 |
| WO | WO 00/62214 | 10/2000 |
| WO | WO 01/26062 | 4/2001 |

* cited by examiner

METHOD FOR PERSONALIZING AN AUTHENTICATION TOKEN

The present application is a divisional of U.S. application Ser. No. 10/176,974, filed Jun. 20, 2002 (U.S. Pat. No. 7,865, 738); which claims priority to Great Britain Patent Application No. 0210692.0, filed May 10, 2002; all of which are incorporated by reference herein.

BACKGROUND OF THE INVENTION

1. Field of the Invention

The present invention relates to an authentication token using a smart card.

2. Description of the Prior Art

There are a variety of technologies available to authenticate remote users in order to enforce secure access control. These range from simple, single factor authentication (such as use of a password) to multiple factor authentication (such as use of a physical token in conjunction with a Personal Identification Number (PIN)). It is widely accepted that single factor authentication offers limited assurance as it is vulnerable to a wide range of attacks, many of which are neither sophisticated nor expensive to mount (such as 'shoulder surfing' or eavesdropping). Most online services, however, still rely on single factor authentication because it appears to be the cheapest to implement—although this is usually because the subsequent cost of dealing with systematic attacks has not been considered.

Dual factor authentication systems are, however, widely used to protect remote access by support staff to these same online services. Many organisations also protect access to their critical corporate systems, both remotely and locally, using such authentication mechanisms. The essence of a dual factor mechanism is that it requires both 'something you know', for example, a PIN or passcode, and 'something you have', for example a physical token that can be authenticated itself. Increasingly, research is being done to add a third type of factor, 'something you are' i.e. biometrics such as retina scan, iris scan or fingerprint, but this is not yet available in a reliable cost-effective way that can be used reliably in a mass-market type environment.

There are a variety of tokens available that can fulfil the role of the second factor ('something you have'), but many of them rely on an infrastructure of interface devices to be able to authenticate them. Thus, use of a smart card requires a card reader to be available to enable the system to interact with the application resident on the smart card. New form factors have been explored to reduce this reliance, such as Universal Serial Bus (USB) tokens that can plug directly into a USB port on a computer. Many new PCs are being shipped with USB ports instead of the older style serial ports or parallel ports, most notebook computers now only have USB ports and all Apple computers have had easily accessible USB ports since the launch of the iMac in 1998.

To remove the dependence on an external infrastructure and to enable the token to be used in as wide a range of channels as possible, a number of manufacturers have developed stand-alone tokens that do not need to be connected to the remote computer system. They interact with the user via a screen and keypad. The user then interacts with the remote system through whatever channel they are using i.e. web, Wireless Application Protocol (WAP) phone, voice, TV set-top box.

Stand-alone tokens generally offer one or more mechanisms by which they can authenticate themselves to the remote system. One approach is for the system to issue a 'challenge' to be entered into the token, for example an apparently meaningless string of numbers. The token applies a cryptographic process, using the challenge and other information that is kept secret inside the token. As a result, it generates a 'response', which is displayed to the user to be sent back to the remote system. The remote system can check that the response received is the correct response from that token to the challenge sent and hence ascertain the authenticity or otherwise of the token. This process may use a symmetric cryptographic process with keys that are shared between the token and the remote system. Alternatively, it may use an asymmetric cryptographic process, removing the need for shared secret keys but requiring significantly more processing capability in the token. In most cases, the remote system does not generate the challenge and authenticate the token's response itself but uses a dedicated local authentication server which is especially established for that purpose and can provide the facility to multiple systems within the same organisation.

There is a variant on this approach where the challenge is generated internally to the token, based on a combination of static data, deterministically varying data (such as an event counter), and dynamic data (such as time). The authentication server must be maintained in synchronisation with the token so that it can reproduce the same challenge when it attempts to validate the response.

An alternative approach has been to use a modern version of the old tried and tested method of having a series of passwords each of which can only be used once. This approach was used by the military for many years, supplying a pad of slips of paper, each of which had a one-time password printed on it. As each password was used it was ripped from the pad and discarded. A matching pad was maintained at the other end to enable messages to be validated. The modern approach is to use a cryptographic process to generate a one-time password dynamically when it is needed. The token and the authentication server share secret information that can be combined with dynamic information available to both (for real-time systems this can be the time) enabling the authentication server to be able to generate the same one-time password that the token has generated and thus validate it. This mechanism uses a symmetric cryptographic process, which enables it to be carried out quickly and cost-effectively in the token. It does not require as much processing at the authentication server as no challenge needs to be generated at the outset, hence only a single interaction is needed between the protected system and the authentication server to authenticate the user.

Smart cards are in use worldwide for a variety of purposes. They have long been in use for financial products (credit, debit and loyalty cards), especially in France where they were invented. With the advent of GSM mobile phones, the smart card market has significantly increased with the need for Subscriber Identification Modules (SIMs). The technology used on smart cards lags leading edge semiconductor technology by 2 or 3 years, thus the speed and power of the processors are relatively low and memory is restricted. As more ambitious uses are devised for smart cards, the technology required is becoming more complex and hence the cost of the cards is increasing. Conversely, the increasing size of the market has led to economies of scale in the most widely used technologies (such as those required for GSM SIMs or memory chips as used in digital cameras and MP3 players).

Asymmetric cryptographic functions are heavily processor intensive and hence significantly slower than symmetric functions (of the order of 100 times slower). The limited processing capability of most smart card chips has restricted their practical use to symmetric cryptographic functions. However, smart card chips are now available with cryptographic co-processors that can execute asymmetric cryptographic functions much more quickly enabling such functions to become a practical option. The newest versions of specifications such as EMV (credit/debit card functionality defined jointly by Europay/Mastercard/Visa) take advantage of these improved capabilities to provide better security features.

Most smart cards have in the past been produced with a specific single application hardwired into Read Only Memory (ROM). International standards (specifically ISO 7816) have established common specifications for smart cards, ranging from size and shape and where the contacts should be, through the electrical characteristics, to the basic communications protocol to interact with the card and the underlying filing system structure that should be implemented on it. Some manufacturers have produced simple proprietary operating systems to handle all the standard activities (like the interface protocol) on behalf of the applications. However, the smart card still has to be hardwired at manufacture with the operating system software and the application software in the ROM. The standards allow for the application software on the card to offer multiple separate 'applications' (such as a credit card, loyalty card and electronic purse) selectable by the interface device with which the card is used. The required application is selected when the card is powered up and 'reset' by the interface device and the appropriate interaction is then conducted with the card. However, these separate applications must all reside together in the smart card's ROM and share the same data areas. Accordingly, they must all trust each other to ensure that the data for one is not read or overwritten by another. Generally, therefore, such cards will only have separate applications that have all been developed by (or for) the same organisation that is issuing the card.

To address these shortcomings, some multi-application smart card operating systems have been developed. These require only the operating system to be hardwired into the smart card's ROM. Applications can be loaded into the card's Electrically Erasable Programmable Read Only Memory (EEPROM) after manufacture. Indeed, they can be subsequently removed or replaced allowing upgraded applications to be delivered onto the smart cards even after they have been issued to end users. To ensure that the applications can not interfere with each other, the applications themselves are written in an interpreted language (such as Java) and the actual execution is under the control of the card's operating system, thus allowing address range checking and other mechanisms to be used to isolate each application and its data. The initial cost of using such cards has led to a slow take up of the technology, but increasing capability of the card processors and larger memory is increasing their practical applicability. New GSM SIMs will be available on multi-application cards, allowing service operators to offer customisable functionality on the SIM independent of the particular phone in use, including value-added services.

The Applicant offers a remote authentication service under the name QUIZID to enable users of a protected computer system (internal users or external customers) to be securely authenticated before being allowed access to the protected system. The current authentication mechanism relies on a device (which must be 'personalised' and securely delivered to the user) that generates one-time passwords; use of the device itself is secured by the use of a colour-coded unique consumer code that must be entered by the user in order to obtain a password. The password and a user ID, entered into the protected system, are sent to QUIZID for validation and if a successful response is received the system can allow access to the user. A more detailed description of this can be found in PCT/GB01/05507. How the QUIZID service is used in relation to other identifying information such as account names or user identification is up to the designers of the protected system. The QUIZID service is designed to be used for protecting access to corporate systems as well as publicly accessible systems such as e-tailers or financial services.

SUMMARY OF THE INVENTION

The present invention provides a design for a remote authentication token using a smart card that an organisation would issue to its customer, along with an interface device to display the one-time password. In a preferred implementation, the invention is used in combination with a remote authentication server for validation of the password and is thus interoperable with the current QUIZID service.

As described above, many financial services are now issuing 'smart' credit or debit cards which have already been personalised and securely delivered to the customer. These same organisations are offering online services that need effective user authentication to protect access to customer data as required by legislation. Consequently, for authentication purposes, use of a smart card that has already been delivered to the customer is cost-effective and will help to reinforce both the organisation's brand and its commitment to security.

These and other objects of the present invention will be apparent from review of the following specification and the accompanying drawings.

BRIEF DESCRIPTION OF THE DRAWINGS

Examples of the present invention will now be described in detail with reference to the accompanying drawings, in which.

DETAILED DESCRIPTION OF THE PREFERRED EMBODIMENT

Figure 1:
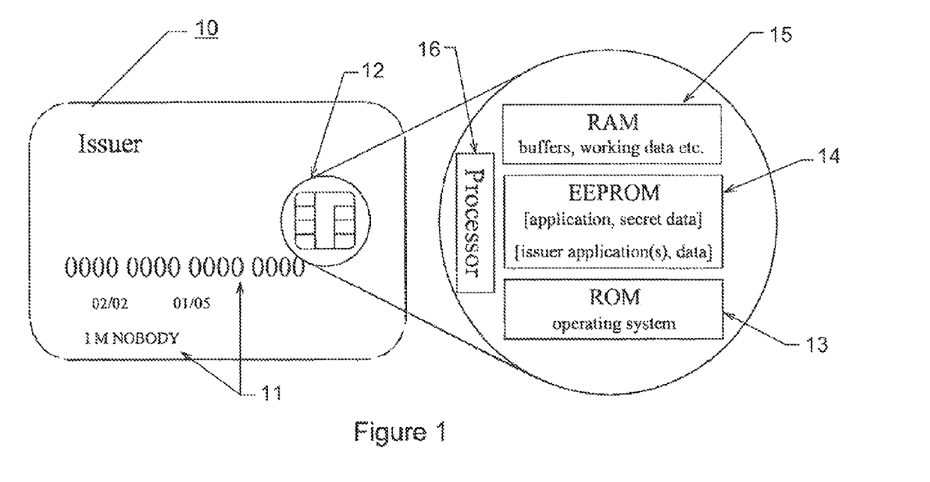
FIG. 1 shows the distribution of components across the memory of a multi-application smart card.
Figure 2:
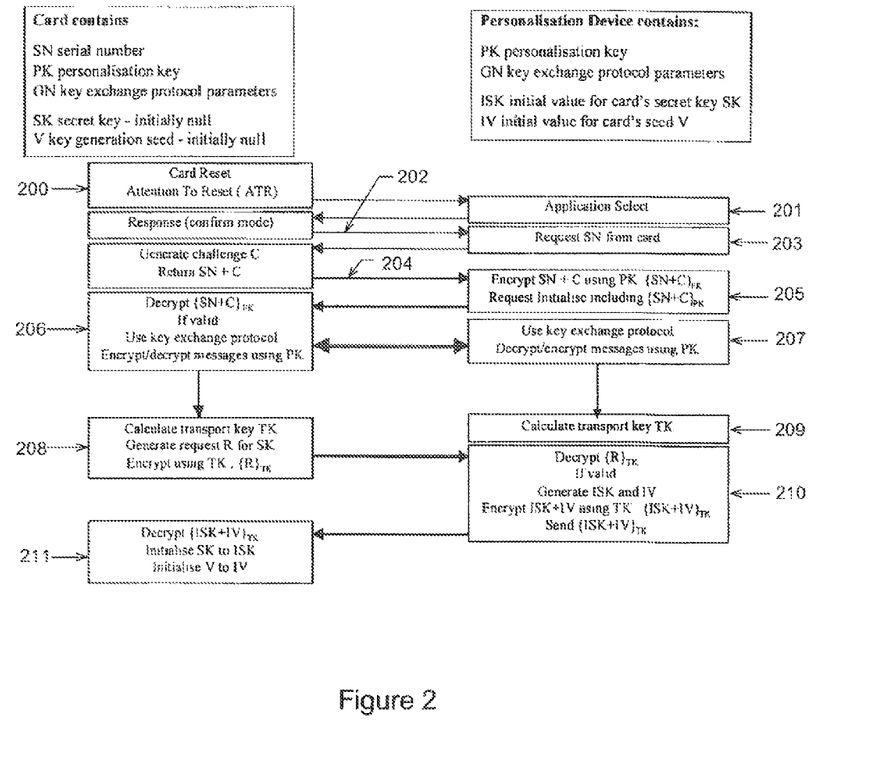
FIG. 2 shows the interaction between a smart card and a personalisation device; and, FIG. 3 shows the interaction between a smart card, an interface device and a user.
Figure 3:
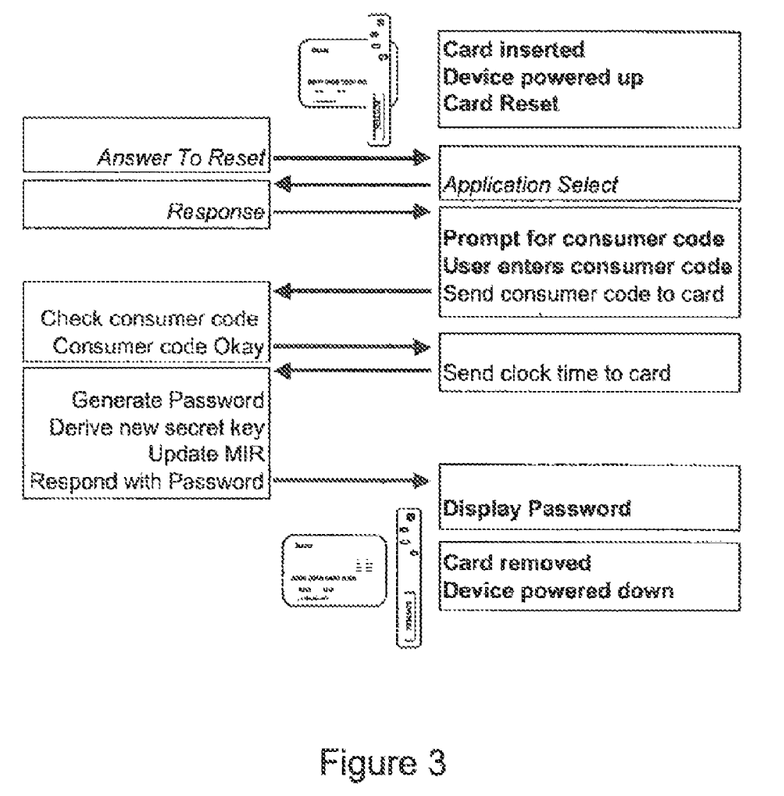

With reference to FIGS. 1 to 3 generally, we now describe the proposed token, including the components of the token, namely the smart card itself and the interface device. We also describe the operation of the token, including the end-user interaction with the token in normal use, the operation of the various components and the interaction between them, and the handling of error conditions. The remote authentication token proposed here combines the functionality of authentication technology, including that provided by the existing QUIZID remote authentication service (described in more detail in PCT/GB01/05507), with the convenience of smart card technology. This type of technology is either already in use or about to be launched by many organisations, especially in the financial services sector.

FIG. 1 shows an example of a smart card 10, which in common with many types of payment card displays account and issuer information 11, and also contains a microchip 12. The chip 12 comprises various types of on board memory, including ROM 13, EEPROM 14 and RAM 15, and also a processor 16. Thus, not only can information be stored on the card, but also an application can be loaded onto the card issued by an organisation to an end-user, for example a credit card with the EMV application. The card has already been personalised for the end-user by the issuer and has been delivered to them by some secure means.

The smart card also contains the authentication application itself. This includes the secret data that is used to generate the passwords and the colour coded unique consumer code. Since the issuing organisation will already be incurring the costs associated with issuing the smart card the additional costs to include the authentication application would be relatively low. The smart card may also contain one or more of the issuer's applications.

The authentication application may be loaded onto the card in one of two ways, depending on the type of smart card.

A 'single application' smart card will have the application and a limited operating system 'burnt' into the ROM 13 at chip manufacture. In this case a version of the authentication application will have been developed in the appropriate language for the card's processor (which may be assembler or a higher level language depending on the chip and tool support). This version of the authentication application will be supplied to the issuer for examination and integration into the ROM mask to be hardwired into the card's chip 12. It may also be combined with the issuer's application(s) prior to manufacture to make the ROM mask. Cards with the application already in the ROM 13 are delivered to the issuer. The card itself is then personalised by the issuer (embossing etc.) and the authentication application is personalised using a specific personalisation device.

If the card is a multi-application card, the operating system will be 'burnt' into the ROM 13 at chip manufacture. The authentication application and any issuer applications will be subsequently loaded onto card. Cards containing only the operating system are delivered to the issuer. The issuer's applications are loaded onto the card through an interaction with the operating system. A version of the authentication application will have been developed in the appropriate language for the card's operating system (such as Java for Javacard or MEL for Multos) and then signed and certified. This version can be loaded at the same time, separately or even subsequently, for example during personalisation by the issuer. Once the authentication application has been loaded it is personalised using a specific personalisation device. Although the multi-application operating systems allow for the loading and personalisation of the authentication application after the card has been issued, in the preferred embodiment it is not intended to issue cards prior to establishing the authentication application on them.

As indicated, whichever type of smart card 10 is used, the application will be personalised to ensure the correct secret data is in the card's EEPROM 14 along with an initial colour coded unique consumer code. Until the application is personalised it cannot be used. Once personalised it cannot be re-personalised. In the following embodiment, the application, once personalised will contain the following elements:

a secret key (SK) stored in EEPROM, used by the cryptographic algorithm to generate passwords;

a unique consumer code stored in EEPROM, used to validate the code entered by the user;

a monotonically increasing register (MIR) stored in EEPROM, used by the cryptographic algorithm to generate passwords;

a seed value (V) stored in EEPROM, used by the key generation algorithm; and, application software to respond to application commands, generate a password and generate a new key.

The application that is loaded onto the smart card operates in three modes. Each mode allows a different limited range of interactions. When the application is first loaded it is in Personalisation mode. In this mode it will respond only to a personalisation command. After personalisation the application is in Normal mode. In this mode it will interact with an interface device to generate passwords when presented with a valid colour coded unique consumer code. If the incorrect unique consumer code is entered in sequential attempts (beyond a pre-set limit) the application enters Locked mode. In this mode the application will only accept (a limited number of) attempts to enter the correct unlock code. If the correct unlock code is entered, the application reverts to Normal mode. The application can never be returned to Personalisation mode.

When the application is loaded onto the smart card it is in a non-personalised state. The secret data has been set to starting values, but the unique key for the card has not been set. The card itself does, however, have a unique serial number. The application is in Personalisation mode. It will not accept any commands from a user's interface device in this mode. It will, however, accept a personalisation command from a personalisation device. The personalisation device requests the serial number, and establishes a private communications channel with the application to enable it to issue the application with seed values for the secret key and the key generation algorithm. The same data is stored securely by the personalisation device for subsequent loading into the authentication server. The card serial number can be used to determine the username that the issuer will associate with the card. Once the seed has been used by the application to set the initial secret key, the application switches to Normal mode.

While there are a variety of suitable mechanisms to secure the communications between the personalisation device and the application, the preferred implementation is to use a key exchange protocol to establish a transport key, supplemented by a pre-defined personalisation key to protect against 'man in the middle' attacks. This is necessary because, although the card may be personalised at the same time that it is loaded with the application, in a multi-application card environment this may be subsequent to the manufacture or issuer personalisation of the card. It may even be performed remotely from the personalisation device, which could be at (or incorporated into) the authentication server, and must therefore be protected against interception.

An example of a personalisation interaction is illustrated in FIG. 2 and the steps involved are described below:

initially, the card is reset (step 200) and responds with an Attention to Reset (ATR).

the personalisation device selects (step 201) the authentication application and determines (step 202) that it is in personalisation mode.

the personalisation device requests (step 203) the card serial number and receives (step 204) the serial number (SN) and a challenge (C) from the card application.

using the pre-defined Personalisation Key (PK) the personalisation device encrypts (step 205) SN and C and returns the encrypted value to the card in a request to commence initialisation.

the card application decrypts (step 206) the received data using PK and validates it as correct. This demonstrates that both the card application and the personalisation device are using the correct PK.

if successful, the card application uses (step 206) the key exchange protocol to generate messages to send back to the personalisation device. The key exchange protocol itself is inherently protected against interception, but the messages are also encrypted (step 206) using PK to protect against 'man in the middle' attacks.

the personalisation device responds (step 207) with the appropriate key exchange protocol messages, encrypted using PK.

at the end of the key exchange, both the card application (step 208) and the personalisation device (step 209) have a unique shared key that is unknown to anyone else including eavesdroppers. This key is used as a Transport Key (TK) for the rest of the personalisation process.

the card application generates a request (step 208) (R) for its Secret Key (SK), encrypts (step 208) the request using TK and sends it to the personalisation device.

the personalisation device decrypts (step 210) the request using TK and validates it as correct. This demonstrates that both the card application and the personalisation device are using the same TK and hence that the key exchange process has worked correctly.

if successful, the personalisation device generates (step 210), or obtains from a pre-generated list, the Initial Secret Key (ISK) and the Initial Value (IV) for the card application's key generation seed (V). ISK and IV are encrypted (step 210) using TK and sent to the card.

the card application decrypts (step 211) the received data using TK, initialises (step 211) its SK to ISK and initialises (step 211) its V to IV. The card application now enters Normal mode.

the personalisation device delivers (step 210) the ISK and IV to the authentication server (if they were not pre-generated and hence already in the authentication server) securely.

Although there may be a number of suitable key exchange protocols available, the preferred implementation is to use the Diffie-Hellman exchange which is within the processing capabilities of the card and does not rely on out of band secure communications to pre-establish any shared secret. The Diffie-Hellman exchange operates as follows:

the card application and personalisation device both know the pre-defined values 'n' (a large prime number) and 'g' (a small single digit number that is primitive mod n). These don't need to be kept secret and can be common to all cards, therefore are included in the application that is loaded onto the card;

the card application generates a large random integer 'x';

the card application calculates $A = g^x \mod n$;

the card application sends A to the personalisation device;

the personalisation device generates a large random integer 'y';

the personalisation device calculates $P = g^Y \mod n$;

the personalisation device send P to the card application;

the card application calculates $K1 = P^x \mod n$;

the personalisation device calculates $K2 = A^y \mod n$; and, both K1 and K2 are equal to $g^{xy} \mod n$ and hence the card application and the personalisation device have calculated the same key which can now be used as the Transport Key (TK).

The second main component of the authentication token is the interface device provided to the end-user. The interface device is a device that can be used with a user's smart card to enable the generation of a password. The device could take a variety of forms, for example a pen or a calculator or a mobile phone battery pack. When the smart card is inserted into the interface device, the user is prompted to enter their colour coded unique consumer code and, if correct, the output response from the interface device is a one-time password. A password so generated can then be entered into the access device, such as a PC, a telephone, a WAP phone, or even by voice, for the service that requires the authentication.

As the smart card is personalised to the customer, the interface device does not need to be. Users, therefore, can share an interface device, for example one at home for use by all members of a family. Equally, users can have more than one, for example one at home, one in the office. Users can even, safely, borrow an interface device from a stranger, for example in a cybercaf or a restaurant. Therefore, in one embodiment, the interface devices are preferably generic, hence all identical and requiring no personalisation for each customer. As they do not need to be personalisable or securely delivered to users (they could even be available over the counter if the issuing organisation has a branch network), it should be possible to keep the associated cost significantly low.

The interface device provides the power to the smart card to enable it to operate. It also includes a real-time clock to enable time to be used as a dynamic input into the password generation process. It therefore includes a battery, which has a reasonably long life but is not accessible by the user. After manufacture, the device's clock can be synchronised with the service's system-wide time through the smart card interface. When battery replacement is required, the device's clock must once again be synchronised (which is why the battery is not user-replaceable). When no smart card is inserted in the slot, the device only provides power to the real-time clock. When a smart card is inserted, the device powers up and applies power to the smart card and to itself. When the smart card is removed the device powers down. For this reason, the device needs no user accessible power switch.

Although the interface device may take one of many forms, it will typically include the following five elements:

i. an interface to the token, initially a set of smart card contacts, but other interfaces would be possible, such as Bluetooth;

ii. an input mechanism, such as a keypad for entry of the colour coded unique consumer code and for menu selection;

iii. an output mechanism, such as a display screen, although other mechanisms could be provided such as voice output for the blind;

iv. a source of a dynamic input to the password generation, such as a battery operated real-time clock; and, v. a processor with application software to handle the interfaces.

Once the user has received the smart card and an interface device they can use the combination to authenticate themselves to the issuer's services, as and when required. The authentication is assured either by an authentication server operated by the issuer themselves or by a shared authentication server such as described in PCT/GB01/05507.

There are many different business models within which strong authentication would be advantageous. An example is given below of a typical interaction, where the issuer provides an online e-commerce service requiring the users to authenticate themselves when they place an order.

1. User browses issuer's online service on their PC.
2. User places order on service.
3. Service prompts user for authentication password in secure form.
4. User inserts smart card into an interface device.
5. Interface device prompts for colour coded unique consumer code entry.

6. User enters colour coded unique consumer code into the interface device.
7. Interface device displays password.
8. User enters password into secure form on issuer's online service on their PC.
9. Service authenticates password with remote authentication service.
10. Service confirms authentication to user, accepts order.
11. User removes the smart card from the interface device.

When the smart card is issued to the user, the application will have been personalised and will be in Normal mode. The user can then use a generic interface device to change the colour coded unique consumer code from the pre-set initial value to one of their own choice. The card will now be able to interact with a generic interface device to generate a password. An example of this type of interaction is shown in FIG. 3.

The process used to generate the one-time password relies on the use of a secret key (SK) in conjunction with a tried and tested cryptographic algorithm. The data that is processed by the algorithm to generate the password is derived from a Monotonically Increasing Register (MIR) that is maintained within the card application and tracked at the authentication server, along with a Dynamic Variable (DV) that can be validated or reproduced at the authentication server. To increase the variability of the passwords and the difficulty of an attempt to spoof the password generation, the secret key is itself modified after each password generation using a key generation algorithm. The authentication server must apply the same algorithms to validate the password and keep in synchronisation with the MIR, SK and V on the card.

The process for password generation is as follows:
the MIR is concatenated with the DV to produce a payload (L);
L is encrypted using the cryptographic algorithm with SK to produce G;
the least significant bits of G are used to generate an integer I;
the least 2 significant bits of DV, concatenated with the least significant bit of MIR, are used to generate an integer D;
I is combined with D to produce the password;
the key generation algorithm uses MIR and SK and a seed V to generate a new key NK and a new seed NV;
SK is replaced with NK;
V is replaced with NV; and,
MIR is incremented.

The inclusion of the 3 bits that are used to create D, enables the authentication server to detect loss of synchronisation with the application on the card. The authentication server will be maintaining its own copy of the MIR for each card. When the password arrives to be validated at the authentication server, the least significant bit of the MIR on the card, as included in the password via D, should match that of the MIR in the server. If not, there may have been a previous password generated that did not arrive at the server, in which case the server increments the MIR and executes the key generation algorithm to obtain the appropriate SK. Similarly, the 2 least significant bits of the DV included in the password via D can be compared with those of the DV reproduced at the authentication server, allowing for a discrepancy to be detected and corrected before the password is validated. Parameters can be established at the authentication server to determine whether (and how many) subsequent values of the MIR should be tried if the validation fails.

The combination of I and D can be achieved in a variety of ways. The 3 bits of D can be interspersed at pre-determined positions in I, the resulting value then being interpreted as a decimal value. Any length password can be generated by selecting the appropriate number of bits of the output of the cryptographic algorithm, for example an eight digit password would be produced from a 26 bit value composed of the 3 bits of D and 23 bits of I. Alternatively, I can be interpreted as a decimal value (the length depending on the number of bits used) and D interpreted as a decimal value (one digit in length as only 3 bits are used). The resulting password would be created by concatenating the digits derived from I with the digit derived from D (or inserting the digit from D into the digits from I). Again, any length password can be generated by selecting the appropriate number of bits of the output of the cryptographic algorithm. An eight digit password would require 23 bits to be used to produce I which would be 7 digits long, with D providing the eighth digit. In the preferred embodiment, an eight digit password will be generated by interpreting 23 bits of the cryptogram as a 7 digit decimal integer I and appending a decimal digit interpreted from the 3 bits of D.

The preferred implementation is to use the Advanced Encryption Standard (AES) with 128 bit keys as the cryptographic algorithm, along with a key generation algorithm based on ANSI X9.17 but using AES and generating 128 bit keys. One of the strengths of AES is that there are no known weak keys, so all keys generated by the key generation algorithm would be acceptable.

As each card must work with any one of the interface devices, the source of the DV in the initial embodiment will be a real-time clock in the interface device. In future embodiments, when the smart card may have it's own source of power, there will be other sources of dynamic variable that could be maintained within the card itself.

The example shown in FIG. 3 illustrates the case where the user enters the unique consumer code correctly first time. If the unique consumer code entered is incorrect the application will respond 'code incorrect' and the interface device will re-prompt for the unique consumer code. This can happen repeatedly up to a preset limit, for example three attempts. If the unique consumer code has not been entered correctly within the limited number of attempts, the application will respond 'Locked' and the interface device will inform the user that the application is locked. The application will enter Locked mode.

When the application is in Locked mode it will not accept commands to generate a password. It will not respond to the normal interactions. When the interface device attempts to interact with the application, it is told (in the Answer To Reset) that the application is locked and informs the user that the application is locked. If the user then enters a sequence of colour codes the interface device will send them to the application as an unlock command. The correct sequence will cause the application to unlock and revert to Normal mode. To obtain the correct sequence the user will have to contact a customer support function. The unlock sequence will only work once. If the application is subsequently locked again a different unlock sequence will be required.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:
1. A method for personalizing an authentication token comprising:

entering by the authentication token into personalization mode;

requesting from the authentication token, by a personalization device in communication with the authentication token, a serial number of the authentication token;

encrypting by the personalization device the serial number using a personalization key, and forwarding the encrypted serial number to the authentication token from the personalization device;

decrypting by the authentication token of the encrypted serial number, and validating by the authentication token that the personalization key is correct;

establishing an encrypted session between the authentication token and the personalization device using a transport key;

sending to the authentication token, by the personalization device, an initial seed value and an initial secret key using the transport key to encrypt the initial seed value and the initial secret key, the initial seed value and the initial secret key for facilitating an initial interaction between the authentication token and an interface device; and storing by the authentication token the initial seed value and the initial secret key after decryption thereof by the authentication token using the transport key, wherein, once the authentication token is personalized with the initial seed value and the initial secret key, the authentication token can no longer enter the personalization mode.

2. The method of claim 1, wherein after the authentication token is provided the initial seed value and the initial secret key, the initial seed value stored in a memory in the authentication token can be used to generate a key for use in generating a secure password used in interacting with the interface device.

3. The method of claim 2, wherein data exchanged between the authentication token and the personalization device for use in generating the secure password is stored by the personalization device for subsequent transfer to a third party.

4. The method of claim 2, further comprising entering by the authentication token into normal mode after said storing the initial seed value and the initial secret key.

* * * * *